(12) United States Patent
Xue et al.

(10) Patent No.: US 10,193,719 B2
(45) Date of Patent: Jan. 29, 2019

(54) SIGNAL PROCESSING METHOD, NETWORK EQUIPMENT, SYSTEM AND COMPUTER STORAGE MEDIUM

(71) Applicant: ZTE CORPORATION, Shenzhen, Guangdong (CN)

(72) Inventors: Fei Xue, Shenzhen (CN); Yajun Zhao, Shenzhen (CN); Zhifeng Ma, Shenzhen (CN)

(73) Assignee: XI'AN ZHONGXING NEW SOFTWARE CO.LTD., Xi'an (CN)

( * ) Notice: Subject to any disclaimer, the term of this patent is extended or adjusted under 35 U.S.C. 154(b) by 0 days.

(21) Appl. No.: 15/573,868

(22) PCT Filed: Dec. 21, 2015

(86) PCT No.: PCT/CN2015/098062
§ 371 (c)(1),
(2) Date: Nov. 14, 2017

(87) PCT Pub. No.: WO2016/184097
PCT Pub. Date: Nov. 24, 2016

(65) Prior Publication Data
US 2018/0287836 A1    Oct. 4, 2018

(30) Foreign Application Priority Data

May 15, 2015  (CN) .......................... 2015 1 0250905

(51) Int. Cl.
*H04L 5/00* (2006.01)
*H04L 27/00* (2006.01)
(Continued)

(52) U.S. Cl.
CPC ........ *H04L 27/0006* (2013.01); *H04L 5/0048* (2013.01); *H04W 16/02* (2013.01); *H04W 74/0816* (2013.01); *H04L 5/001* (2013.01); *H04L 5/0098* (2013.01); *H04W 72/0453* (2013.01)

(58) Field of Classification Search
CPC .................................................. H04L 27/0006

USPC ......................................................... 370/329
See application file for complete search history.

(56) References Cited

U.S. PATENT DOCUMENTS

2013/0208587 A1* 8/2013 Bala ...................... H04W 16/14
                                                              370/230
2016/0135148 A1* 5/2016 Novlan ..................... H04L 1/00
                                                              370/329
(Continued)

FOREIGN PATENT DOCUMENTS

CN    104486013 A    4/2015
CN    104539405 A    4/2015

OTHER PUBLICATIONS

International Search Report in international application No. PCT/CN2015/098062, dated Mar. 10, 2016, 2 pgs.
(Continued)

*Primary Examiner* — Shripal K Khajuria
(74) *Attorney, Agent, or Firm* — Cooper Legal Group, LLC

(57) ABSTRACT

A signal processing method, network equipment and a system are provided, wherein the method includes that: a first reference signal is generated by Inverse Fast Fourier Transform (IFFT) processing based on a frequency-domain density of the first reference signal and an energy value of the first reference signal on a time-frequency resource; a time-frequency resource location of a target channel is determined, wherein the target channel is configured to carry information of a Licensed Assisted Access (LAA) system; a Clear Channel Assessment (CCA) signal is generated based on the time-frequency resource location of the target channel and the first reference signal, the CCA signal is mapped to the target channel, and the CCA signal is sent to receiver network equipment through the target channel to enable the receiver network equipment to determine whether the target channel is configured for the LAA system according to the CCA signal.

13 Claims, 15 Drawing Sheets

(51) Int. Cl.
*H04W 74/08* (2009.01)
*H04W 16/02* (2009.01)
*H04W 72/04* (2009.01)

(56) References Cited

U.S. PATENT DOCUMENTS

2016/0227485 A1* 8/2016 Davydov ............ H04W 52/146
2016/0302230 A1* 10/2016 Novlan ................ H04B 17/318
2016/0360437 A1* 12/2016 Larsson ................ H04W 24/10
2017/0094675 A1* 3/2017 Salem ................. H04W 72/085

OTHER PUBLICATIONS

English Translation of the Written Opinion of the International Search Authority in international application No. PCT/CN2015/098062, dated Mar. 10, 2016, 6 pgs.
Supplementary European Search Report in European application No. 15892471.2, dated Apr. 24, 2018, 9 pgs.
ZTE: "On Reservation Signal", Feb. 20125, 3GPP TSG RAN WG1 Meeting #80, R1-150155, 3rd Generation Partnership Project (3GPP), Mobile Competence Centre; 650. Route Des Lucioles; F-06921, Sophia-Antipolis Cedes ; France vol. RAN WG1, no. Athens. Greece; Feb. 9, 2015-Feb. 13, 2015,Retrieved from the Internet:URL:http://www.3gpp.org/ftp/Meetings 3GPP SYNC/RAN1/Docs/, 6 pgs.
ZTE: "Design on reservation signal for LAA", Mar. 2015, 3GPP TSG RAN WG1 Ad-hoc Meeting; R1-151025, 3rd Generation Partnership Project (3GPP), Mobile Competence Centre; 650, Route Des Lucioles; F-06921 Sophia-Antipolis Cedex; France,vol. RAN WG1. no. Paris. France; Retrieved from the Internet:URL:http://www.3gpp.org/ftp/tsgran/WG1 RL1/TSGR1 AH/LTE LAA 1503/Docs/,4 pgs.

* cited by examiner

SIGNAL PROCESSING METHOD, NETWORK EQUIPMENT, SYSTEM AND COMPUTER STORAGE MEDIUM

TECHNICAL FIELD

The disclosure relates to a channel processing technology in the field of communications, and particularly to a signal processing method, network equipment, a system, and a computer storage medium.

BACKGROUND

In recent years, with rapid development of mobile Internet, a requirement of a mobile user on system capacity is increasing, and shows a trend to exponential increase. Due to a using characteristic of an unlicensed spectrum, that is, multiple sets of systems or multiple pieces of equipment need to compete for a channel using right, the channel using right is shared between the systems or the device in a time division manner. After a Licensed Assisted Access (LAA) base station obtains the channel using right, there may exist a phenomenon that occupancy of an LAA system over a channel cannot be effectively identified and an opposite end further cannot rapidly determine a channel occupied by the LAA system because a signal sending starting time point is at a middle location of a sub-frame, particularly the signal sending starting time point is at a middle location of an Orthogonal Frequency Division Multiplexing (OFDM) symbol, which influences a user experience for the LAA system.

SUMMARY

In view of this, embodiments of the disclosure provide a signal processing method, network equipment, a system, and a computer storage medium, which may at least solve the problem in a conventional art.

To this end, the technical solutions of the disclosure are implemented as follows.

The embodiments of the disclosure provide a signal processing method, applied to sender network equipment, the method including that:

a first reference signal is generated based on a frequency-domain density of the first reference signal and an energy value of the first reference signal on a time-frequency resource;

a time-frequency resource location of a target channel is determined, wherein the target channel may be configured to carry information of an LAA system; and a Clear Channel Assessment (CCA) signal is generated based on the time-frequency resource location of the target channel and the first reference signal, the CCA signal is mapped to the target channel, and the CCA signal is sent to receiver network equipment through the target channel to enable the receiver network equipment to determine whether the target channel is applicable to the LAA system according to the CCA signal.

In the solution, the operation that the first reference signal is generated based on the frequency-domain density of the first reference signal and the energy value of the first reference signal on the time-frequency resource may include that:

the frequency-domain density of the first reference signal is acquired:

energy information of the first reference signal is determined based on the frequency-domain density of the first reference signal;

a frequency-domain signal of the first reference signal is generated based on the energy information of the first reference signal; and the frequency-domain signal of the first reference signal is converted into a time-domain signal.

In the solution, the operation that the CCA signal is generated based on the time-frequency resource location of the target channel and the first reference signal may include that:

a sending mode of the CCA signal is determined based on the time-frequency resource location of the target channel, and the CCA signal is generated based on the sending mode of the CCA signal and the time-domain signal of the first reference signal.

In the solution, the operation that the sending mode of the CCA signal is determined based on the time-frequency resource location of the target channel may include that:

it is determined that the CCA signal is sent once for every preset number of subcarriers on a frequency domain; a sending moment of the CCA signal is acquired, and a first duration is determined based on the sending moment of the CCA signal;

when the first duration is larger than or equal to a preset threshold value, the sending mode of the CCA signal is determined as a first sending mode, the first sending mode referring to sending of the CCA signal only within the first duration; and when the first duration is smaller than the preset threshold value, the sending mode of the CCA signal is determined as a second sending mode, the second sending mode referring to sending of the CCA signal within the first duration, a next adjacent complete OFDM symbol on a time domain and a cyclic prefix length of the OFDM symbol.

In the solution, the operation that the CCA signal is generated based on the sending mode of the CCA signal and the time-domain signal of the first reference signal may include that:

when the sending mode of the CCA signal is the first sending mode, a duration of the time-domain signal of the first reference signal is set to be the first duration to obtain the CCA signal; and when the sending mode of the CCA signal is the second sending mode, the duration of the time-domain signal of the first reference signal is set to be equal to a sum of the first duration, a duration of a complete OFDM symbol and the cyclic prefix length of the OFDM symbol to obtain the CCA signal.

In the solution, the operation that the CCA signal is generated based on the time-frequency resource location of the target channel and the first reference signal may include that:

it is determined that the CCA signal is sent once for every preset number of subcarriers on a frequency domain; the sending moment of the CCA signal is acquired, and the first duration is determined through taking the sending moment of the CCA signal as a starting point on a time domain; and a sum of the first duration, a next adjacent complete OFDM symbol on the time domain and a cyclic prefix length of the OFDM symbol is determined as a sending duration of the CCA signal, and the CCA signal is obtained through cycling the time-domain signal of the first reference signal based on the sending duration to obtain.

The embodiments of the disclosure provide a signal processing method, applied to a receiver network equipment, the method including that:

a target channel is accessed;

whether a CCA signal is carried in the target channel is determined based on a preset first reference signal; and if the CCA signal is carried in the target channel, it is determined that the target channel is applicable to transmit information of an LAA system.

In the solution, the operation that whether the CCA signal is carried in the target channel is determined based on the preset first reference signal may include that: sliding cross-correlation processing is performed on a receiving signal through a ¼ OFDM symbol of a time-domain signal of the first reference signal, wherein a sliding interval may be the ¼ OFDM symbol, and if at least two detection peak values consistent with a preset condition exist within two OFDM symbol time lengths, the target channel may be occupied by the LAA system.

The embodiments of the disclosure provide sender network equipment, which may include:

a signal generation unit, configured to generate a first reference signal based on a frequency-domain density of the first reference signal and an energy value of the first reference signal on a time-frequency resource;

a setting unit, configured to determine a time-frequency resource location of a target channel, the target channel being configured to carry information of an LAA system, and generate a CCA signal based on the time-frequency resource location of the target channel and the first reference signal; and a sending unit, configured to map the CCA signal to the target channel, and send the CCA signal to receiver network equipment through the target channel to enable the receiver network equipment to determine whether the target channel is applicable to the LAA system according to the CCA signal.

In the solution, the signal generation unit may be configured to acquire the frequency-domain density of the first reference signal; determine energy information of the first reference signal based on the frequency-domain density of the first reference signal; generate a frequency-domain signal of the first reference signal based on the energy information of the first reference signal; and convert the frequency-domain signal of the first reference signal into a time-domain signal.

In the solution, the setting unit may be configured to determine a sending mode of the CCA signal based on the time-frequency resource location of the target channel, and generate the CCA signal based on the sending mode of the CCA signal and the time-domain signal of the first reference signal.

In the solution, the setting unit may be configured to determine that the CCA signal is sent once for every preset number of subcarriers on a frequency domain; acquire a sending moment of the CCA signal, and determine a first duration based on the sending moment of the CCA signal; when the first duration is larger than or equal to a preset threshold value, determine the sending mode of the CCA signal as a first sending mode, the first sending mode referring to sending of the CCA signal only within the first duration; and when the first duration is smaller than the preset threshold value, determine the sending mode of the CCA signal as a second sending mode, the second sending mode referring to sending of the CCA signal within the first duration, a next adjacent complete OFDM symbol on a time domain and a cyclic prefix length of the OFDM symbol.

In the solution, the setting unit may be configured to, when the sending mode of the CCA signal is the first sending mode, set a duration of the time-domain signal of the first reference signal to be the first duration to obtain the CCA signal; and when the sending mode of the CCA signal is the second sending mode, set the duration of the time-domain signal of the first reference signal to be equal to a sum of the first duration, a duration of a complete OFDM symbol and the cyclic prefix length of the OFDM symbol to obtain the CCA signal.

In the solution, the setting unit may be configured to determine that the CCA signal is sent once for every preset number of subcarriers on a frequency domain; acquire the sending moment of the CCA signal, and determine the first duration through taking the sending moment of the CCA signal as a starting point on a time domain; and determine a sum of the first duration, a next adjacent complete OFDM symbol on the time domain and acyclic prefix length of the OFDM symbol as a sending duration of the CCA signal, and obtain the CCA signal thorough cycling the time-domain signal of the first reference signal based on the sending duration.

The embodiments of the disclosure provide receiver network equipment, which may include:

a receiving unit, configured to access a target channel; and a signal processing unit, configured to determine whether a CCA signal is carried in the target channel based on a preset first reference signal, and if the CCA signal is carried in the target channel, determine that the target channel is applicable to transmit information of an LAA system.

In the solution, the signal processing unit may be configured to perform sliding cross-correlation processing with a receiving signal through a ¼ OFDM symbol of a time-domain signal of the first reference signal, wherein a sliding interval may be the ¼ OFDM symbol, and if at least two detection peak values consistent with a preset condition exist within two OFDM symbol time lengths, the target channel may be occupied by the LAA system.

The embodiments of the disclosure provide a signal processing system, which may include:

sender network equipment, configured to generate a first reference signal based on a frequency-domain density of the first reference signal and an energy value of the first reference signal on a time-frequency resource, determine a time-frequency resource location of a target channel, the target channel being configured to carry information of an LAA system, generate a CCA signal based on the time-frequency resource location of the target channel and the first reference signal, map the CCA signal to the target channel, and send the CCA signal to receiver network equipment through the target channel; and the receiver network equipment, configured to access the target channel, determine whether the CCA signal is carried in the target channel based on the preset first reference signal, and if the CCA signal is carried in the target channel, determine that the target channel is applicable to transmit the information of the LAA system.

The embodiments of the disclosure provide a computer storage medium, in which a computer-executable instruction may be stored, the computer-executable instruction being configured to execute the abovementioned signal processing method.

With adoption of the solutions, according to the signal processing method, network equipment and system provided by the disclosure, the first reference signal is generated, and after the target channel to be occupied by the LAA system is determined, the CCA signal is generated based on the first reference signal, and the CCA signal is mapped to the target channel and sent to the receiver network equipment. In such a manner, a channel occupied by the LAA system may be effectively identified by setting a special CCA signal, so that the receiver network equipment may rapidly determine the channel occupied by the LAA system, and a user experience for the LAA system may be improved.

DETAILED DESCRIPTION

First Embodiment

Figure 1:
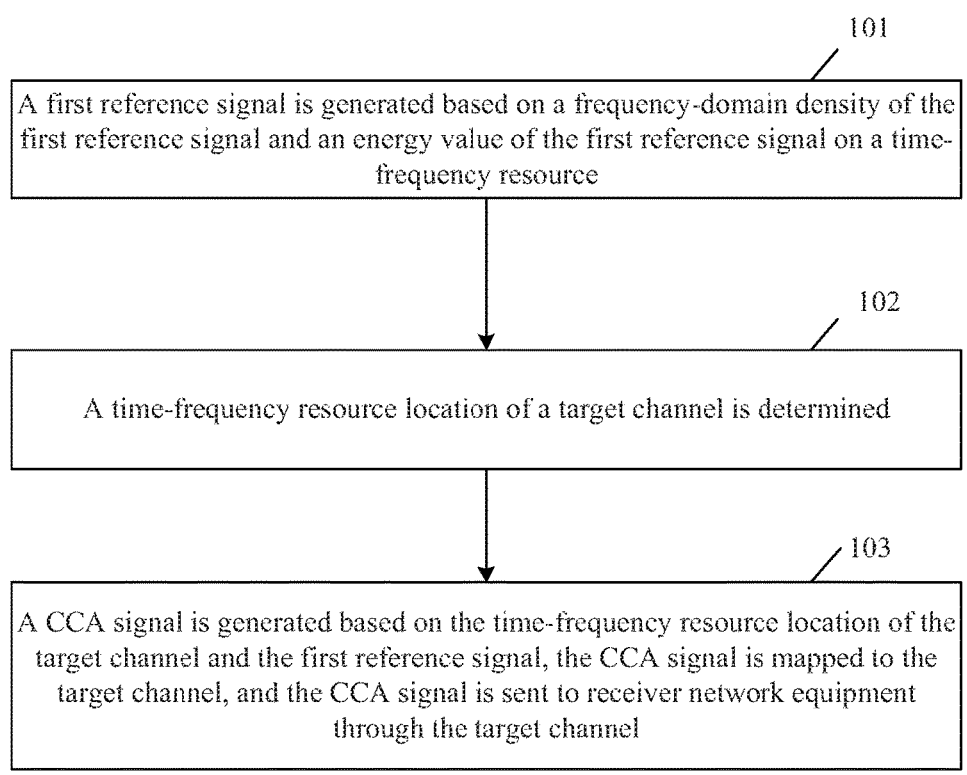
FIG. 1 is a flowchart in a sender of a signal processing method according to an embodiment of the disclosure.

The first embodiment of the disclosure provides a signal processing method, applied to sender network equipment. As shown in FIG. 1, the method includes the following steps.

In Step 101, a first reference signal is generated based on a frequency-domain density of the first reference signal and an energy value of the first reference signal on a time-frequency resource.

In Step 102, a time-frequency resource location of a target channel is determined, wherein the target channel is configured to carry information of an LAA system.

In Step 103, a CCA signal is generated based on the time-frequency resource location of the target channel and the first reference signal, the CCA signal is mapped to the target channel, and the CCA signal is sent to receiver network equipment through the target channel to enable the receiver network equipment to determine whether the target channel is applicable to the LAA system according to the CCA signal.

Here, the first reference signal may be a Cell-References Signal (CRS).

The sender network equipment may be a base station or terminal with an LAA function.

Figure 2:
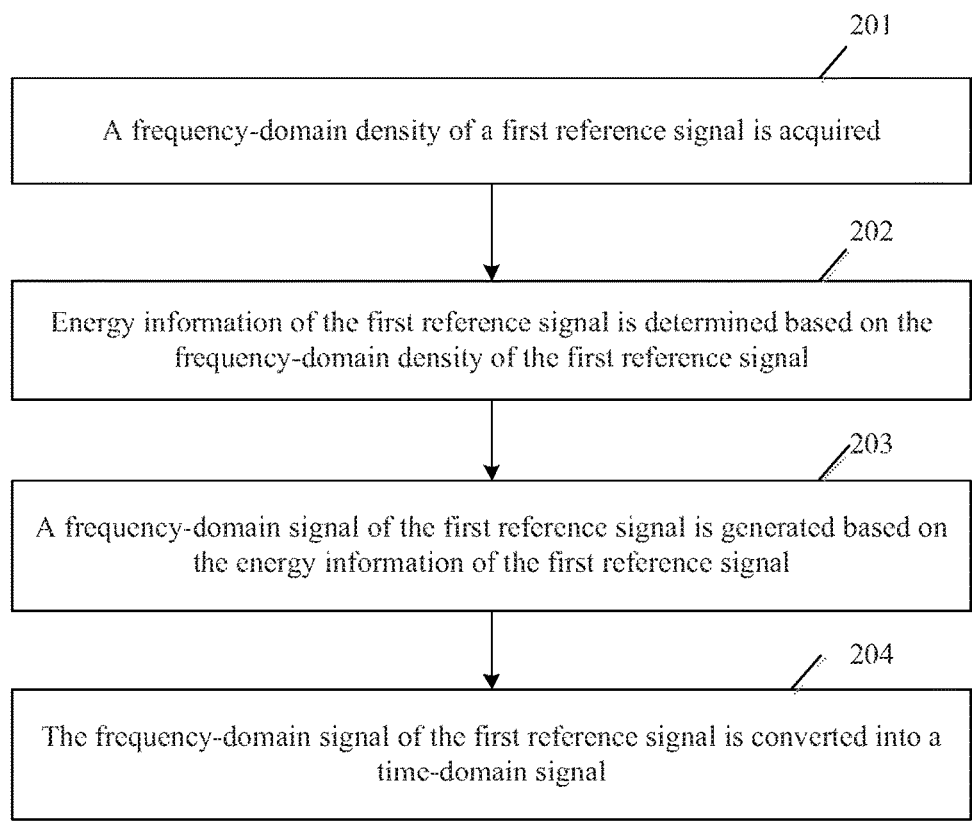
FIG. 2 is a flowchart of generating a first reference signal according to an embodiment of the disclosure.

Preferably, as shown in FIG. 2, the operation that the first reference signal is generated based on the frequency-domain density of the first reference signal and the energy value of the first reference signal on the time-frequency resource in Step 101 may include the following operations.

In Step 201, the frequency-domain density of the first reference signal is acquired.

In Step 202, energy information of the first reference signal is determined based on the frequency-domain density of the first reference signal.

In Step 203, a frequency-domain signal of the first reference signal is generated based on the energy information of the first reference signal.

In Step 204, the frequency-domain signal of the first reference signal is converted into a time-domain signal.

Wherein, when the first reference signal is a CRS, the frequency-domain density of the first reference signal may be acquired in the following manner: a frequency-domain interval for transmitting the CRS is determined, and the frequency-domain density of the CRS is determined based on the frequency-domain interval of the CRS.

Figure 3:
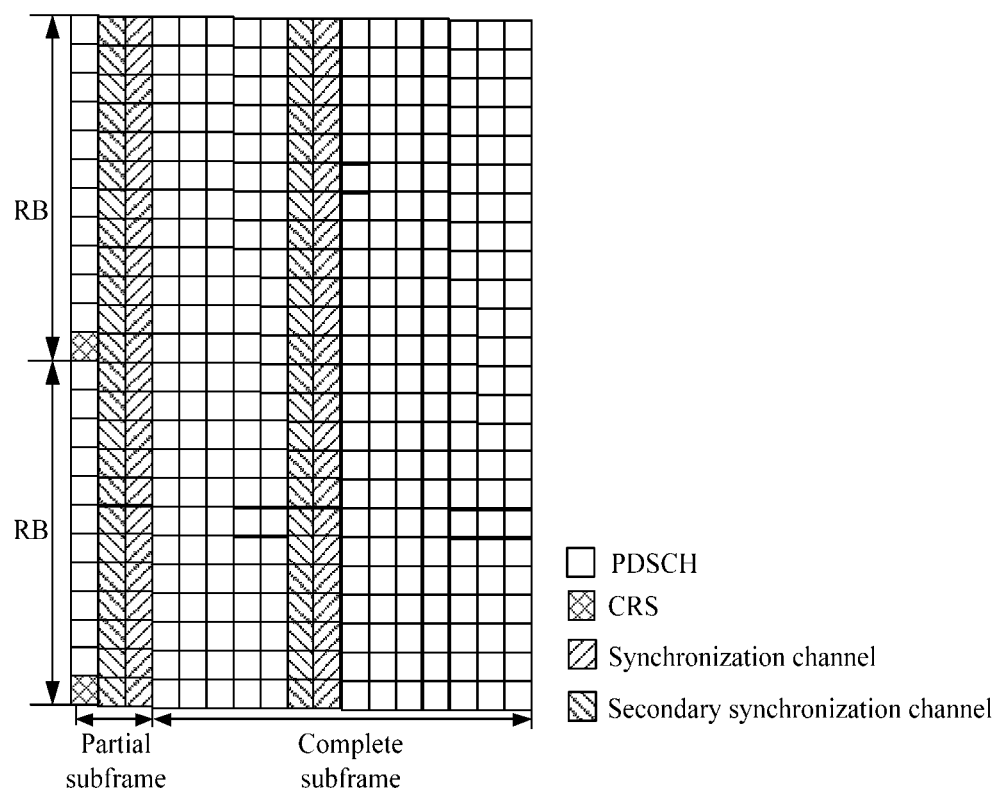
FIG. 3 is a first structure diagram of a time-frequency resource of a signal according to an embodiment of the disclosure.

For example, in the disclosure, the frequency-domain interval of the CRS is extended to 12 subcarriers, that is, there is one CRS Resource Element (RE) in every 12 subcarriers. In the embodiment, a first OFDM symbol in each Resource Block (RB) is set as a time-domain location of the CRS. As shown in FIG. 3, there is only one RE resource in an RB for transmitting the CRS, and other RE resources are not filled with signals.

The operation that the energy information of the first reference signal is determined based on the frequency-domain density of the first reference signal may include that: if a bandwidth of the LAA system is 20 MHz, then there are included 100 RB resources and there are 100 RE resources configured to transmit the CRS, energy of each CRS RE resource is determined through a following manner, i.e., Energy Per RE (EPRE) [dB]=P[dB]−10*log 10(100), where P is sending power of the sender network equipment, such as the LAA base station or the LAA terminal. In addition, in the embodiment, power of each CRS RE is the EPRE. Because normalized Quadrature Phase Shift Keying (QPSK) is adopted for the CRS RE in a 3rd Generation Partnership Project (3GPP) protocol, amplitude information of the CRS RE is required to be determined during practical sending, and thus the amplitude information is usually specified through the EPRE in a standard, such that the signal energy of these CRS REs may reach to a sending power so as to enable the coverage to be maintained.

In the method, the frequency-domain signal of the first reference signal may be generated in a following manner: generating the frequency-domain signal with a length of 100 RE resources using a conventional Long Term Evolution (LTE) CRS generation manner, and simultaneously determining a starting location of CRS REs according to a cell Identifier (ID), shift=mod(cell_ID,12).

Figure 4:
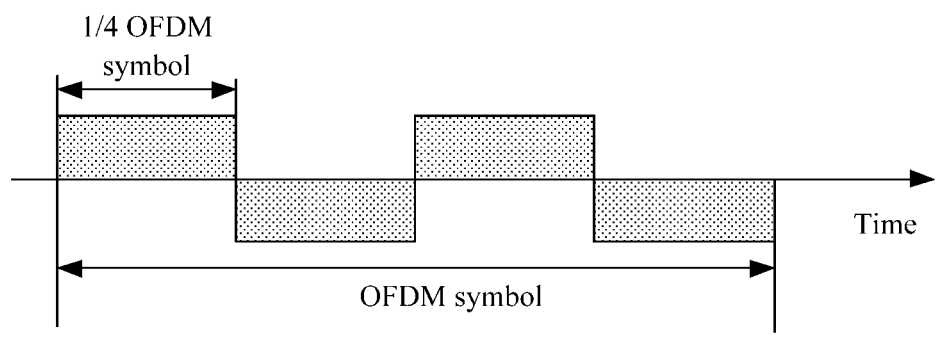
FIG. 4 is a schematic diagram of a time-domain signal of a first reference signal according to an embodiment of the disclosure.

The frequency-domain signal of the CRS may be generated in a following manner: generating Cinit; generating a Gold sequence with a length of 200 according to Cinit; generating a QPSK signal from the generated Gold sequence; determining a frequency-domain starting location according to the cell ID (Cell_ID); and generating the time-domain signal of the CRS through Inverse Fast Fourier Transform (IFFT), as shown in FIG. 4.

Preferably, the time-frequency resource location of the target channel may be determined in the embodiment as follows: a time-domain location of the target channel is determined to be before than a time-domain location of a synchronization channel or a secondary synchronization channel; and a frequency-domain location of the target channel is determined to be the whole bandwidth. The target channel may be adjacent to the synchronization channel and before than the synchronization channel with respect to the location. In addition, the CCA signal is sent before the synchronization channel, so that a lag phenomenon which is caused when the synchronization channel or the secondary synchronization channel is used to indirect determine a channel occupied by the LAA that may be avoided. Moreover, in the solution, the channel occupied by the LAA may be determined by directly utilizing a time-domain characteristic of the CRS, and decoding processing of a receiver is not required, so that a recognition speed can be ensured.

Furthermore, a time-domain location of the target channel may be acquired in a following manner: since the target channel is an unlicensed channel, the target channel and a licensed channel are operated in a carrier aggregation manner, and the target channel is time synchronized with the licensed channel, the LAA system can acquire the sending moment of the CCA in the target channel upon obtaining a channel using right in the target channel, such that the time-domain location of the target channel is acquired.

The operation that the CCA signal is generated based on the time-frequency resource location of the target channel and the first reference signal may include that: a sending mode of the CCA signal is determined based on the time-frequency resource location of the target channel, and the CCA signal is generated based on the sending mode of the CCA signal and the time-domain signal of the first reference signal.

Wherein, the operation that the sending mode of the CCA signal is determined based on the time-frequency resource location of the target channel may include that: it is determined that the CCA signal is sent once for every preset number of subcarriers on a frequency domain; a sending moment of the CCA signal is acquired, and a first duration is determined based on the sending moment of the CCA signal;

when the first duration is larger than or equal to a preset threshold value, the sending mode of the CCA signal is determined as a first sending mode, the first sending mode referring to sending of the CCA signal only within the first duration; and when the first duration is smaller than the preset threshold value, the sending mode of the CCA signal is determined as a second sending mode, the second sending mode referring to sending of the CCA signal within the first duration, a next adjacent complete OFDM symbol on a time domain and a cyclic prefix length of the OFDM symbol, wherein the preset threshold value may be a duration of a ½ OFDM symbol, wherein a cyclic prefix of the OFDM symbol is a prefix before the OFDM symbol on the time domain.

The first duration may be determined in a following manner: determining the sending moment of the CCA signal as a starting point, determining a starting moment of the next adjacent complete OFDM symbol on the time domain as an ending point, and determining a duration between the starting point and the ending point as the first duration.

In the embodiment, the operation that the CCA signal is generated based on the sending mode of the CCA signal and the time-domain signal of the first reference signal may include that: when the sending mode of the CCA signal is the first sending mode, a duration of the time-domain signal of the first reference signal is set to be the first duration to obtain the CCA signal; and when the sending mode of the CCA signal is the second sending mode, the duration of the time-domain signal of the first reference signal is set to be equal to a sum of the first duration, a duration of a complete OFDM symbol and the cyclic prefix length of the OFDM symbol to finally obtain the CCA signal.

Figure 5:
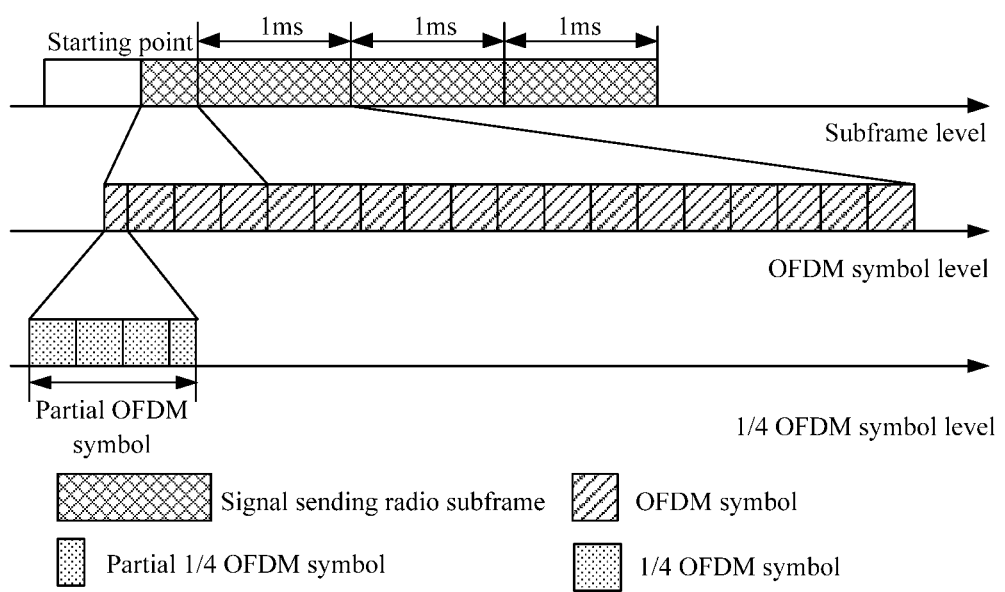
FIG. 5 is a first schematic diagram of a CCA signal according to an embodiment of the disclosure.
Figure 6:
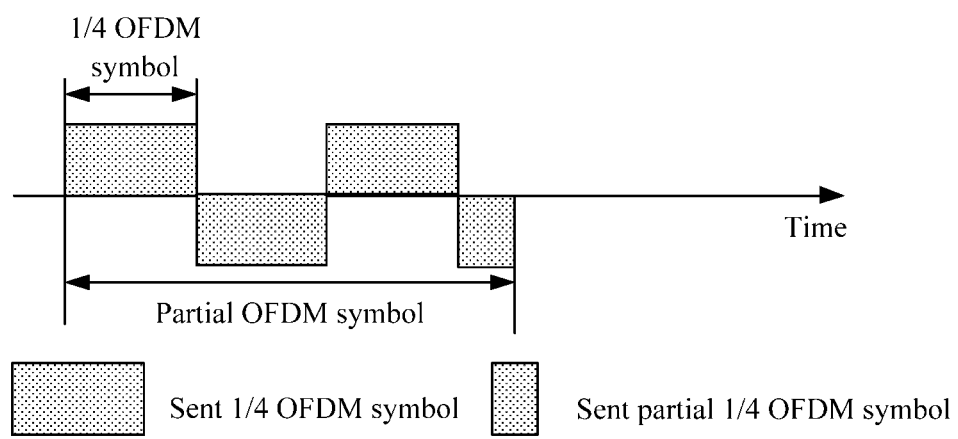
FIG. 6 is a second schematic diagram of a CCA signal according to an embodiment of the disclosure.

For example, when the sending mode of the CCA signal is the first sending mode, as shown in FIG. 5, the first duration is a duration of a partial OFDM symbol, and is larger than a ½ OFDM duration, the CCA signal is sent in the first duration, and a time-domain schematic diagram of the CCA signal is shown in FIG. 6, that is, the first reference signal in FIG. 3 is intercepted according to the first duration to obtain a CCA signal, a duration of which is smaller than a duration of an OFDM symbol. A time-frequency schematic diagram of a signal sent by the LAA is shown in FIG. 3, in which another signal, for example, a synchronization signal or the secondary synchronization channel, is sent in the next OFDM symbol. In addition, partial OFDM may be effectively utilized to send a CRS with a structural characteristic, so that a sending time of the partial OFDM is effectively utilized.

Figure 7:
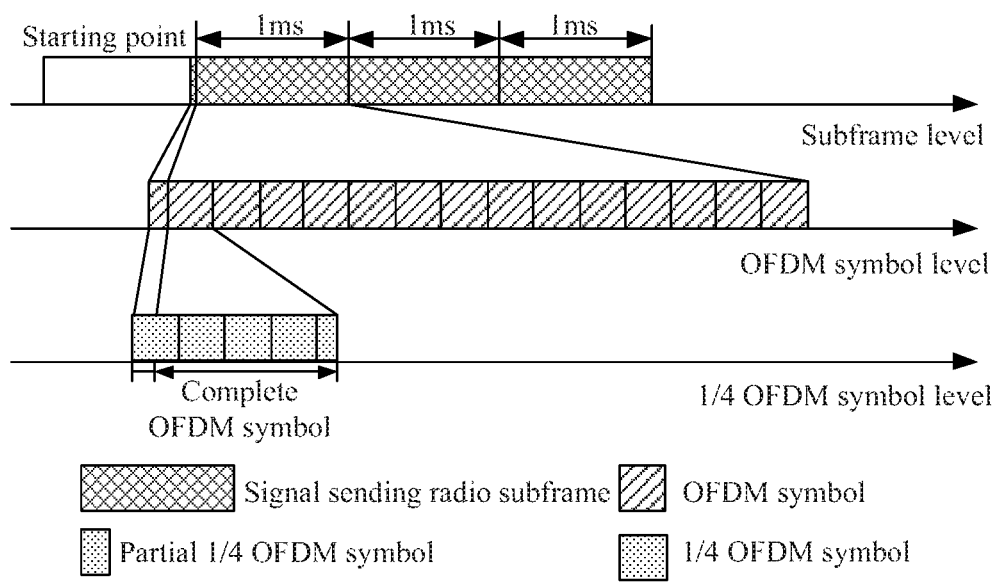
FIG. 7 is a third schematic diagram of a CCA signal according to an embodiment of the disclosure.
Figure 8:
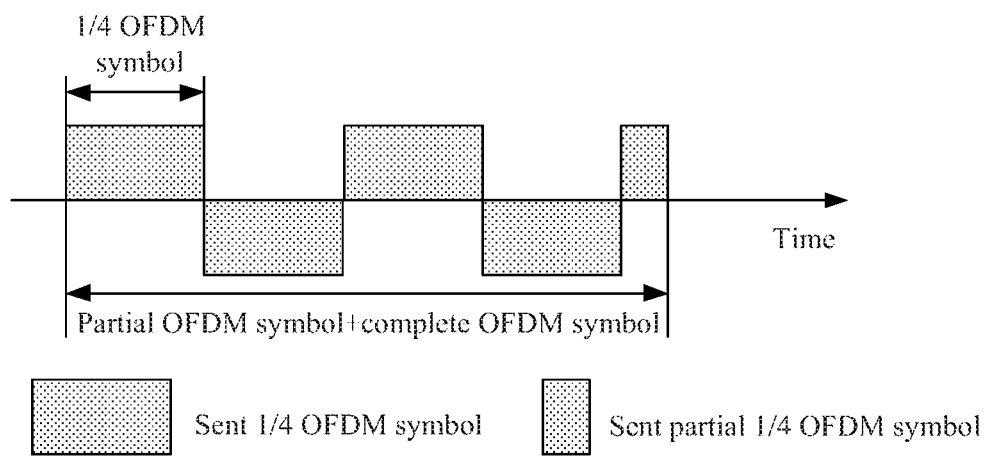
FIG. 8 is a fourth schematic diagram of a CCA signal according to an embodiment of the disclosure.
Figure 9:
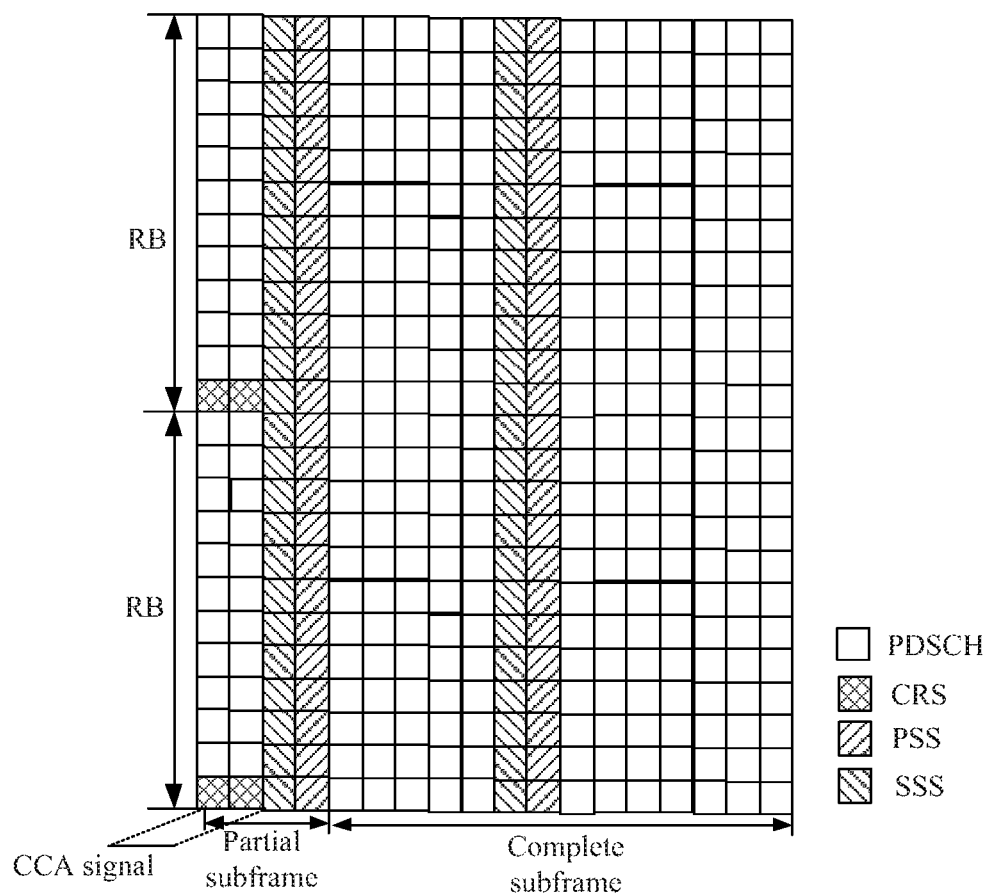
FIG. 9 is a second structure diagram of a time-frequency resource of a signal according to an embodiment of the disclosure.

When the sending mode of the CCA signal is the second sending mode, as shown in FIG. 7, the first duration is a duration of a partial OFDM symbol and is larger than the ½ OFDM duration, the CCA signal is determined by cyclically repeating the first reference signal in the first duration, the next adjacent OFDM symbol on the time domain and the cyclic prefix length of the OFDM symbol. A time-domain schematic diagram of the CCA signal is specifically shown in FIG. 8. A time-frequency schematic diagram of a signal sent by the LAA is shown in FIG. 9, and the synchronization channel or the secondary synchronization channel is sent in a next OFDM symbol of the next OFDM symbol.

Thus, with the above solution, the first reference signal is generated at first, and, then the CCA signal is generated based on the first reference signal after the target channel to be occupied by the LAA system is determined, and the CCA signal is mapped to the target channel and sent to the receiver network equipment. In such a manner, a channel occupied by the LAA system may be effectively identified by setting a special CCA signal, so that the receiver network equipment may rapidly determine the channel occupied by the LAA system, and a user experience for the LAA system may be improved.

Second Embodiment

The second embodiment of the disclosure provides a signal processing method, applied to sender network equipment. As shown in FIG. 1, the method includes the following steps.

In Step 101, a first reference signal is generated based on a frequency-domain density of the first reference signal and an energy value of the first reference signal on a time-frequency resource.

In Step 102, a time-frequency resource location of a target channel is determined, wherein the target channel is configured to carry information of an LAA system.

In Step 103, a CCA signal is generated based on the time-frequency resource location of the target channel and the first reference signal, the CCA signal is mapped to the target channel, and the CCA signal is sent to receiver network equipment through the target channel to enable the receiver network equipment to determine whether the target channel is applicable to the LAA system according to the CCA signal.

Here, the first reference signal may be a CRS.

The sender network equipment may be a base station or terminal with an LAA function.

Preferably, as shown in FIG. 2, Step 101 may include the following operations.

In Step 201, the frequency-domain density of the first reference signal is acquired.

In Step 202, energy information of the first reference signal is determined based on the frequency-domain density of the first reference signal.

In Step 203, a frequency-domain signal of the first reference signal is generated based on the energy information of the first reference signal.

In Step 204, the frequency-domain signal of the first reference signal is converted into a time-domain signal.

Wherein, when the first reference signal is a CRS, the frequency-domain density of the first reference signal may be acquired in the following manner: a frequency-domain interval for transmitting the CRS is determined, and the frequency-domain density of the CRS is determined based on the frequency-domain interval of the CRS.

For example, in the disclosure, the frequency-domain interval of the CRS is extended to 12 subcarriers, that is, there is one CRS RE in every 12 subcarriers. In the embodiment, a first OFDM symbol in each RB is set as a time-domain location of the CRS. As shown in FIG. 3, there is only one RE resource in an RB for transmitting the CRS, and other RE resources are not filled with signals.

The operation that the energy information of the first reference signal is determined based on the frequency-domain density of the first reference signal may include that: if a bandwidth of the LAA system is 20 MHz, then there are included 100 RB resources and there are 100 RE resources configured to transmit the CRS, energy of each CRS RE resource is determined through a following manner, i.e., EPRE $[dB]=P[dB]-10*\log 10(100)$, where P is sending power of the sender network equipment, such as the LAA base station or the LAA terminal. In addition, in the embodiment, power of each CRS RE is the EPRE. Because normalized QPSK is adopted for the CRS RE in a 3GPP protocol, amplitude information of the CRS RE is required to be determined during practical sending, and thus the amplitude information is usually specified through the EPRE in a standard, such that the signal energy of these CRS REs may reach to a sending power so as to enable the coverage to be maintained.

In the method, the frequency-domain signal of the first reference signal may be generated in a following manner: generating the frequency-domain signal with a length of 100 RE resources using a conventional LTE CRS generation manner, and simultaneously determining a starting location of CRS REs according to a cell ID, shift=mod(cell_ID,12).

The frequency-domain signal of the CRS may be generated in a following manner: generating Cinit; generating a Gold sequence with a length of 200 according to Cinit; generating a QPSK signal from the generated Gold sequence; determining a frequency-domain starting location according to the cell ID (Cell_ID); and generating the time-domain signal of the CRS through IFFT, as shown in FIG. 4.

Preferably, the time-frequency resource location of the target channel may be determined in the embodiment as follows: a time-domain location of the target channel is determined to be before than a time-domain location of a synchronization channel or a secondary synchronization channel; and a frequency-domain location of the target channel is determined to be the whole bandwidth. The target channel may be adjacent to the synchronization channel and before than the synchronization channel with respect to the location.

In addition, the CCA signal is sent before the synchronization channel, so that a lag phenomenon which is caused when the synchronization channel or the secondary synchronization channel is used to indirect determine a channel occupied by the LAA that may be avoided. Moreover, in the solution, the channel occupied by the LAA may be determined by directly utilizing a time-domain characteristic of the CRS, and decoding processing of a receiver is not required, so that a recognition speed can be ensured.

Furthermore, a time-domain location of the target channel may be acquired in a following manner: since the target channel is an unlicensed channel, the target channel and a licensed channel are operated in a carrier aggregation manner, and the target channel is time synchronized with the licensed channel, the LAA system can acquire the sending moment of the CCA in the target channel upon obtaining a channel using right in the target channel, such that the time-domain location of the target channel is acquired.

The operation that the CCA signal is generated based on the time-frequency resource location of the target channel and the first reference signal may include that: it is determined that the CCA signal is sent once for every preset number of subcarriers on a frequency domain, wherein the preset number may be set according to a practical condition, and for example, may be set according to the frequency-domain density of the first reference signal, and in the embodiment, sending may be performed once for every 12 subcarriers;

a sending moment of the CCA signal is acquired, and a first duration is determined based on taking the sending moment of the CCA signal as a starting point on the time domain; and a sum of the first duration, a next adjacent complete OFDM symbol on the time domain and acyclic prefix length of the OFDM symbol is determined as a sending duration of the CCA signal, and the time-domain signal of the first reference signal is cycled based on the sending duration to obtain the CCA signal.

Specifically, a preset threshold value may be a duration of a ½ OFDM symbol.

Figure 10:
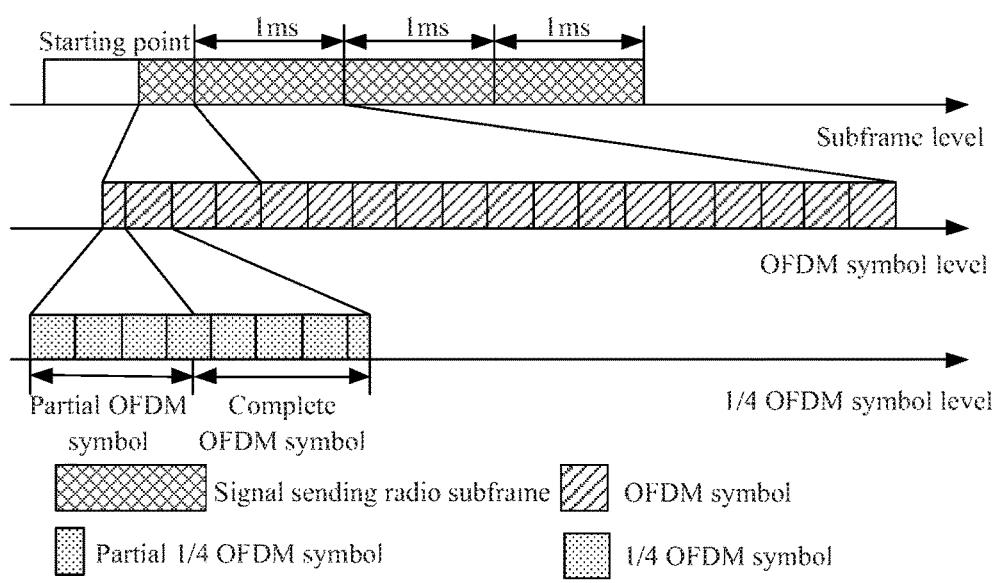
FIG. 10 is a fifth schematic diagram of a CCA signal according to an embodiment of the disclosure.
Figure 11:
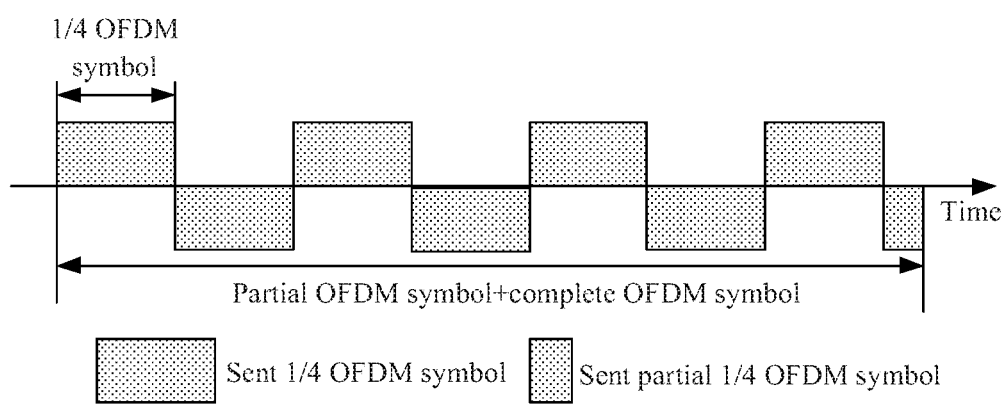
FIG. 11 is a sixth schematic diagram of a CCA signal according to an embodiment of the disclosure.

For example, as shown in FIG. 7, the first duration is a duration of a partial OFDM symbol and is smaller than a ½ OFDM duration, the CCA signal is determined by cyclically repeating the first reference signal in the first duration, the next adjacent OFDM symbol on the time domain and the cyclic prefix length of the OFDM symbol. A time-domain schematic diagram of the CCA signal is specifically shown in FIG. 10. A time-frequency schematic diagram of an LAA sent signal is shown in FIG. 11, the synchronization channel or the secondary synchronization channel is sent in a next OFDM symbol of the next OFDM symbol. In addition, partial OFDM may be effectively utilized to send a CRS with a structural characteristic, so that a sending time of the partial OFDM is effectively utilized.

Thus, with the above solution, the first reference signal may be generated at first, and then the CCA signal is generated based on the first reference signal after the target channel to be occupied by the LAA system is determined, and the CCA signal is mapped to the target channel and sent to the receiver network equipment. In such a manner, a channel occupied by the LAA system may be effectively identified by setting a special CCA signal, so that the receiver network equipment may rapidly determine the channel occupied by the LAA system, and a user experience for the LAA system may be improved.

Third Embodiment

Figure 12:
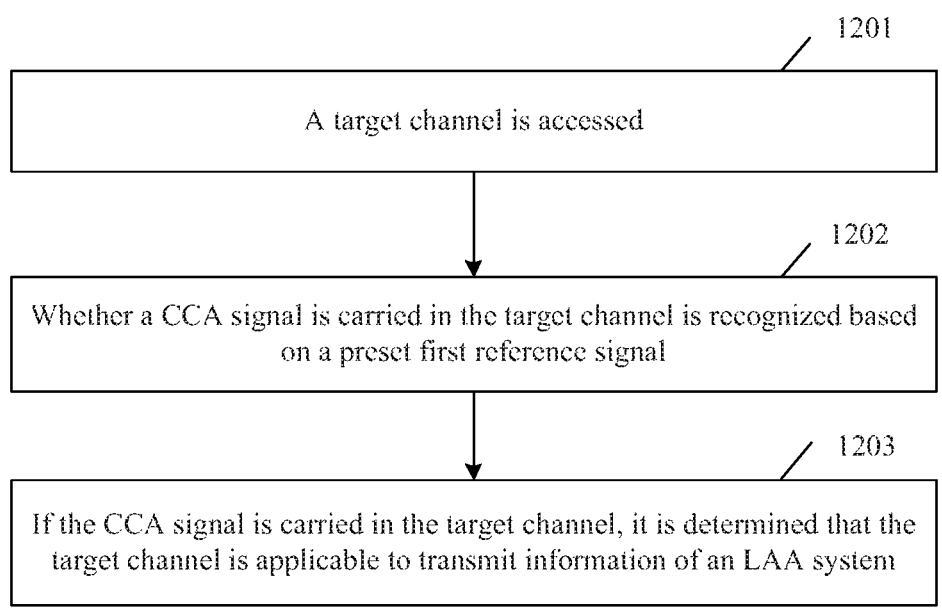
FIG. 12 is a flowchart in a receiver of a signal processing method according to an embodiment of the disclosure.

The third embodiment of the disclosure provides a signal processing method, applied to receiver network equipment and, as shown in FIG. 12, including the following steps.

In Step 1201, a target channel is accessed.

In Step 1202, whether a CCA signal is carried in the target channel is determined based on a preset first reference signal.

In Step 1203, if the CCA signal is carried in the target channel, it is determined that the target channel is applicable to transmit information of an LAA system.

Here, the first reference signal may be a time-domain signal of a CRS signal preset in the receiver network equipment.

The receiver network equipment may be a base station or terminal with an LAA function.

The operation that whether the CCA signal is carried in the target channel is determined based on the preset first reference signal may include that: sliding cross-correlation processing is performed on a receiving signal through a ¼ OFDM symbol of a time-domain signal of the first reference signal, wherein a sliding interval is the ¼ OFDM symbol, and if at least two detection peak values consistent with a preset condition exist within two OFDM symbol time lengths, the target channel is occupied by the LAA system.

Specifically, the preset condition may be that: a difference value between the detection peak values is smaller than a threshold value, and for example, may be smaller than 0.1.

Preferably, after Step 1203 is performed, it may be determined that the target channel is occupied by the LAA system, and then subsequent processing is performed according to an operating flow of the LAA system.

In the embodiment, the first reference signal may be preset through pre-inputting by a manager, and the first reference signal may also obtained by a following manner, for example: acquiring a frequency-domain density of the first reference signal; determining energy information of the first reference signal based on the frequency-domain density of the first reference signal; generating a frequency-domain signal of the first reference signal based on the energy information of the first reference signal; and converting the frequency-domain signal of the first reference signal into a time-domain signal.

Wherein, when the first reference signal is a CRS, the frequency-domain density of the first reference signal may be acquired in a following manner: determining a frequency-domain interval for transmitting the CRS, and determining the frequency-domain density of the CRS based on the frequency-domain interval for the CRS.

For example, in the disclosure, the frequency-domain interval of the CRS is 12 extended to subcarriers, that is, there is one CRS RE in every 12 subcarriers. In the embodiment, a first OFDM symbol in each RB is set as a time-domain location of the CRS. As shown in FIG. 3, there is only one RE resource in an RB for transmitting the CRS, and other RE resources are not filled with signals.

The operation that the energy information of the first reference signal is determined based on the frequency-domain density of the first reference signal may include that: if a bandwidth of the LAA system is 20 MHz, then there are included 100 RB resources and there are 100 RE resources configured to transmit the CRS, energy of each CRS RE resource is determined through a following manner, i.e., EPRE [dB]=P[dB]−10*log 10(100), where P is sending power of sender network equipment, such as an LAA base station or an LAA terminal. In addition, in the embodiment, power of each CRS RE is the EPRE. Because normalized QPSK is adopted for the CRS RE in a 3GPP protocol, amplitude information of the CRS RE is required to be determined during practical sending, and thus the amplitude information is usually specified through the EPRE in a standard, such that the signal energy of these CRS REs may reach to a sending power so as to enable the coverage to be maintained.

In the method, the frequency-domain signal of the first reference signal may be generated in a following manner: generating the frequency-domain signal with a length of 100 RE resources using a conventional LTE CRS generation manner, and simultaneously determining a starting location of CRS REs according to a cell ID, shift-mod(cell_ID,12).

The frequency-domain signal of the CRS may be generated in a following manner: generating Cinit; generating a Gold sequence with a length of 200 according to Cinit; generating a QPSK signal from the generated Gold sequence; determining a frequency-domain starting location according to the cell ID (Cell_ID); and generating the time-domain signal of the CRS through IFFT, as shown in FIG. 4.

Thus, with the above the solution, the first reference signal may be generated at first, and then the CCA signal is generated based on the first reference signal after the target channel to be occupied by the LAA system is determined, and the CCA signal is mapped to the target channel and sent to the receiver network equipment. In such a manner, a channel occupied by the LAA system may be effectively identified by setting a special CCA signal, so that the receiver network equipment may rapidly determine the channel occupied by the LAA system, and a user experience for the LAA system may be improved.

Fourth Embodiment

Figure 13:
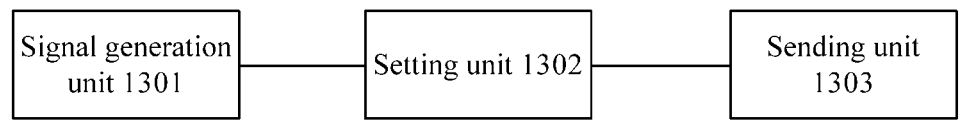
FIG. 13 is a structure diagram of sender network equipment according to an embodiment of the disclosure.

The fourth embodiment of the disclosure provides sender network equipment, as shown in FIG. 13, including:

a signal generation unit 1301, configured to generate a first reference signal based on a frequency-domain density of the first reference signal and an energy value of the first reference signal on a time-frequency resource;

a setting unit 1302, configured to determine a time-frequency resource location of a target channel, the target channel being configured to carry information of an LAA system, and generate a CCA signal based on the time-frequency resource location of the target channel and the first reference signal; and a sending unit 1303, configured to map the CCA signal to the target channel, and send the CCA signal to receiver network equipment through the target channel to enable the receiver network equipment to determine whether the target channel is configured for the LAA system according to the CCA signal.

Here, the first reference signal may be a CRS.

The sender network equipment may be a base station or terminal with an LAA function.

Preferably, the signal generation unit is specifically configured to acquire the frequency-domain density of the first reference signal; determine energy information of the first reference signal based on the frequency-domain density of the first reference signal; generate a frequency-domain signal of the first reference signal based on the energy information of the first reference signal; and convert the frequency-domain signal of the first reference signal into a time-domain signal.

Wherein, when the first reference signal is a CRS, the frequency-domain density of the first reference signal may be acquired in the following manner: a frequency-domain interval for transmitting the CRS is determined, and the frequency-domain density of the CRS is determined based on the frequency-domain interval of the CRS.

For example, in the disclosure, the frequency-domain interval of the CRS is extended to 12 subcarriers, that is, there is one CRS RE in every 12 subcarriers. In the embodiment, a first OFDM symbol in each RB is set as a time-domain location of the CRS. As shown in FIG. 3, there is only one RE resource in an RB for transmitting the CRS, and other RE resources are not filled with signals.

The signal generation unit is specifically configured to, if a bandwidth of the LAA system is 20 MHz, then there are included 100 RB resources and there are 100 RE resources configured to transmit the CRS, determine energy of each CRS RE resource through a following manner, i.e., EPRE [dB]=P[dB]−10*log 10(100), where P is sending power of the sender network equipment, such as the LAA base station or the LAA terminal. In addition, in the embodiment, power of each CRS RE is the EPRE. Because normalized QPSK is adopted for the CRS RE in a 3GPP protocol, amplitude information of the CRS RE is required to be determined during practical sending, and thus the amplitude information is usually specified through the EPRE in a standard, such that the signal energy of these CRS REs may reach to a sending power so as to enable the coverage to be maintained.

In the method, the frequency-domain signal of the first reference signal may be generated in a following manner: generating the frequency-domain signal with a length of 100 RE resources using a conventional LTE CRS generation manner, and simultaneously determining a starting location of CRS REs according to a cell ID, shift-mod(cell_ID,12).

The frequency-domain signal of the CRS may be generated in a following manner: generating Cinit; generating a Gold sequence with a length of 200 according to Cinit; generating a QPSK signal from the generated Gold sequence; determining a frequency-domain starting location according to the cell ID (Cell_ID); and generating the time-domain signal of the CRS through IFFT, as shown in FIG. 4.

Preferably, the signal generation unit in the embodiment may specifically be configured to determine the time-frequency resource location of the target channel by: determining that a time-domain location of the target channel to be before than a time-domain location of a synchronization channel or a secondary synchronization channel; and determining that a frequency-domain location of the target channel to be the whole bandwidth. The target channel may be adjacent to the synchronization channel and before than the synchronization channel with respect to the location.

The setting unit is specifically configured to determine a sending mode of the CCA signal based on the time-frequency resource location of the target channel, and generate the CCA signal based on the sending mode of the CCA signal and the time-domain signal of the first reference signal.

Wherein, the setting unit is specifically configured to:

determine that the CCA signal is sent once for every preset number of subcarriers on a frequency domain; acquire a sending moment of the CCA signal, and determine a first duration based on the sending moment of the CCA signal; and when the first duration is larger than or equal to a preset threshold value, determine that the sending mode of the CCA signal as a first sending mode, the first sending mode referring to sending of the CCA signal only within the first duration; and when the first duration is smaller than the preset threshold value, determine that the sending mode of the CCA signal as a second sending mode, the second sending mode referring to sending of the CCA signal within the first duration, a next adjacent complete OFDM symbol on a time domain and a cyclic prefix length of the OFDM symbol, wherein the preset threshold value may be a duration of a ½ OFDM symbol.

Furthermore, a time-domain location of the target channel may be acquired in a following manner: since the target channel is an unlicensed channel, the target channel and a licensed channel are operated in a carrier aggregation manner, and the target channel is time synchronized with the licensed channel, so that the LAA system can acquire the sending moment of the CCA in the target channel upon obtaining a channel using right in the target channel, such that the time-domain location of the target channel is acquired.

The first duration may be determined in a following manner: determining the sending moment of the CCA signal as a starting point, determining a starting moment of the next adjacent complete OFDM symbol on the time domain as an ending point, and determining a duration between the starting point and the ending point as the first duration.

The setting unit in the embodiment is specifically configured to, when the sending mode of the CCA signal is the first sending mode, set a duration of the time-domain signal of the first reference signal to be the first duration to obtain the CCA signal; and when the sending mode of the CCA signal is the second sending mode, set the duration of the time-domain signal of the first reference signal to be equal to a sum of the first duration, a duration of complete OFDM symbol and the cyclic prefix length of the OFDM symbol to obtain the CCA signal.

For example, when the sending mode of the CCA signal is the first sending mode, as shown in FIG. 5, the first duration is a duration of a partial OFDM symbol, and is larger than a ½ OFDM duration, the CCA signal is sent in the first duration, and a time-domain schematic diagram of the CCA signal is shown in FIG. 6, that is, the first reference signal in FIG. 3 is intercepted according to the first duration to obtain a CCA signal, a duration of which is smaller than a duration of an OFDM symbol. A time-frequency schematic diagram of a signal sent by the LAA is shown in FIG. 3, in which another signal, such as a synchronization signal or the secondary synchronization channel, is sent in the next OFDM symbol.

When the sending mode of the CCA signal is the second sending mode, as shown in FIG. 7, the first duration is a duration of a partial OFDM symbol, and is larger than the ½ OFDM duration, the CCA signal is determined by cyclically repeating the first reference signal in the first duration, the next adjacent OFDM symbol on the time domain and the cyclic prefix length of the OFDM symbol. A time-domain schematic diagram of the CCA signal is specifically shown in FIG. 8. A time-frequency schematic diagram of a signal set by the LAA is shown in FIG. 9, and the synchronization channel or the secondary synchronization channel is sent in a next OFDM symbol of the next OFDM symbol.

Thus, with the above solution, the first reference signal may be generated at first, and then the CCA signal is generated based on the first reference signal after the target channel to be occupied by the LAA system is determined, and the CCA signal is mapped to the target channel and sent to the receiver network equipment. In such a manner, a channel occupied by the LAA system may be effectively identified by setting a special CCA signal, so that the receiver network equipment may rapidly determine the channel occupied by the LAA system, and a user experience for the LAA system may be improved.

Fifth Embodiment

The fifth embodiment of the disclosure provides sender network equipment, as shown in FIG. 13, including:

a signal generation unit 1301, configured to generate a first reference signal based on a frequency-domain density of the first reference signal and an energy value of the first reference signal on a time-frequency resource;

a setting unit 1302, configured to determine a time-frequency resource location of a target channel, the target channel being configured to carry information of an LAA system, and generate a CCA signal based on the time-frequency resource location of the target channel and the first reference signal; and a sending unit 1303, configured to map the CCA signal to the target channel, and send the CCA signal to receiver network equipment through the target channel to enable the receiver network equipment to determine whether the target channel is applicable to the LAA system according to the CCA signal.

Here, the first reference signal may be a CRS.

The sender network equipment may be a base station or terminal with an LAA function.

Preferably, the signal generation unit 1301 is configured to acquire the frequency-domain density of the first reference signal; determine energy information of the first reference signal based on the frequency-domain density of the first reference signal; generate a frequency-domain signal of the first reference signal based on the energy information of the first reference signal; and convert the frequency-domain signal of the first reference signal into a time-domain signal.

Wherein, when the first reference signal is a CRS, the frequency-domain density of the first reference signal may be acquired in the following manner: a frequency-domain interval for transmitting the CRS is determined, and the frequency-domain density of the CRS is determined based on the frequency-domain interval of the CRS.

For example, in the disclosure, the frequency-domain interval of the CRS is extended to 12 subcarriers, that is, there is one CRS RE in every 12 subcarriers. In the embodiment, a first OFDM symbol in each RB is set as a time-domain location of the CRS. As shown in FIG. 3, there is only one RE resource in an RB for transmitting the CRS, and other RE resources are not filled with signals.

The signal generation unit 1301 is configured to, if a bandwidth of the LAA system is 20 MHz, then there are included 100 RB resources and there are 100 RE resources configured to transmit the CRS, determine energy of each CRS RE resource through a following manner, i.e., EPRE [dB]=P[dB]−10*log 10(100), where P is sending power of the sender network equipment, such as the LAA base station or the LAA terminal. In addition, in the embodiment, power of each CRS RE is the EPRE. Because normalized QPSK is adopted for the CRS RE in a 3GPP protocol, amplitude information of the CRS RE is required to be determined during practical sending, and thus the amplitude information is usually specified through the EPRE in a standard, such that the signal energy of these CRS REs may reach to a sending power so as to enable the coverage to be maintained.

In the method, the frequency-domain signal of the first reference signal may be generated in a following manner: generating the frequency-domain signal with a length of 100 RE resources using a conventional LTE CRS generation manner, and simultaneously determining a starting location of CRS REs according to a cell ID, shift=mod(cell_ID,12).

The frequency-domain signal of the CRS may be generated in a following manner: generating Cinit; generating a Gold sequence with a length of 200 according to Cinit; generating a QPSK signal from the generated Gold sequence; determining a frequency-domain starting location according to the cell ID (Cell_ID); and generating the time-domain signal of the CRS through IFFT, as shown in FIG. 4.

Preferably, the signal generation unit 1301 is configured to determine a time-domain location of the target channel to be before than a time-domain location of a synchronization channel or a secondary synchronization channel; and determine a frequency-domain location of the target channel to be the whole bandwidth. The target channel may be adjacent to the synchronization channel and before than the synchronization channel. The CCA signal is sent before the synchronization channel, so that a lag phenomenon which is caused when the synchronization channel or the secondary synchronization channel is used to indirect determine a channel occupied by the LAA that may be avoided. Moreover, in the solution, the channel occupied by the LAA may be determined by directly utilizing a time-domain characteristic of the CRS and decoding processing of a receiver is not required, so that a recognition speed can be ensured.

Furthermore, a time-domain location of the target channel may be acquired in a following manner: since the target channel is an unlicensed channel, the target channel and a licensed channel are operated in a carrier aggregation manner, and the target channel is time synchronized with the licensed channel, so that the LAA system can acquire the sending moment of the CCA in the target channel upon obtaining a channel using right in the target channel, such that the time-domain location of the target channel is acquired.

The setting unit is specifically configured to determine that the CCA signal is sent once for every preset number of subcarriers on a frequency domain, wherein the preset number may be set according to a practical condition, and for example, may be set according to the frequency-domain density of the first reference signal, and in the embodiment, sending may be performed once for every 12 subcarriers;

acquire a sending moment of the CCA signal, and determine a first duration based on taking the sending moment of the CCA signal as a starting point on the time domain; and determine a sum of the first duration, a next adjacent complete OFDM symbol on the time domain and acyclic prefix length of the OFDM symbol as a sending duration of the CCA signal, and cycle the time-domain signal of the first reference signal based on the sending duration to obtain the CCA signal.

Wherein, a preset threshold value may be a duration of a ½ OFDM symbol.

For example, as shown in FIG. 7, the first duration is a duration of a partial OFDM symbol, and is smaller than a ½ OFDM duration, the CCA signal is determined by cyclically repeating the first reference signal in the first duration, the next adjacent OFDM symbol on the time domain and the cyclic prefix length of the OFDM symbol. A time-domain schematic diagram of the CCA signal is specifically shown in FIG. 10. A time-frequency schematic diagram of an LAA sent signal is shown in FIG. 11, the synchronization channel or the secondary synchronization channel is sent in a next OFDM symbol of the next OFDM symbol. In addition, partial OFDM may be effectively utilized to send a CRS with a structural characteristic, so that a sending time of the partial OFDM is effectively utilized.

Thus, with the above solution, the first reference signal may be generated at first, and then the CCA signal is generated based on the first reference signal after the target channel to be occupied by the LAA system is determined, and the CCA signal is mapped to the target channel and sent to the receiver network equipment. In such a manner, a channel occupied by the LAA system may be effectively identified by setting a special CCA signal, so that the receiver network equipment may rapidly determine the channel occupied by the LAA system, and a user experience for the LAA system may be improved.

Sixth Embodiment

Figure 14:
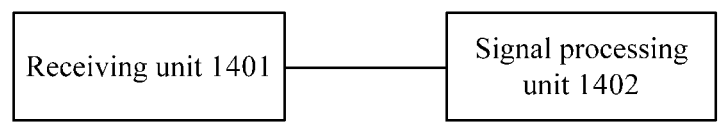
FIG. 14 is a structure diagram of receiver network equipment according to an embodiment of the disclosure.

The sixth embodiment of the disclosure provides receiver network equipment, as shown in FIG. 14, including:

a receiving unit 1401, configured to access a target channel; and a signal processing unit 1402, configured to determine whether a CCA signal is carried in the target channel based on a preset first reference signal, and if the CCA signal is carried in the target channel, determine that the target channel is applicable to transmit information of an LAA system.

Here, the first reference signal may be a time-domain signal of a CRS signal preset in the receiver network equipment.

The receiver network equipment may be a base station or terminal with an LAA function.

The signal processing unit 1402 is configured to perform sliding cross-correlation processing with a receiving signal through a ¼ OFDM symbol of a time-domain signal of the first reference signal, wherein a sliding interval is the ¼ OFDM symbol, and if at least two detection peak values consistent with a preset condition exist within two OFDM symbol time lengths, the target channel is occupied by the LAA system.

Specifically, the preset condition may be that: a difference value between the detection peak values is smaller than a threshold value, and for example, may be smaller than 0.1.

Preferably, it may be determined that the target channel is occupied by the LAA system, and then subsequent processing is performed according to an operating flow of the LAA system.

In the embodiment, the first reference signal may be preset through pre-inputting by a manager, and the first reference signal may also be obtained by a following manner, for example, the signal processing unit 1402 is configured to: acquire a frequency-domain density of the first reference signal; determine energy information of the first reference signal based on the frequency-domain density of the first reference signal; generate a frequency-domain signal of the first reference signal based on the energy information of the first reference signal; and convert the frequency-domain signal of the first reference signal into a time-domain signal.

Wherein, when the first reference signal is a CRS, the frequency-domain density of the first reference signal may be acquired in the following manner: determining a frequency-domain interval for transmitting the CRS, and determining the frequency-domain density of the CRS based on the frequency-domain interval for the CRS.

For example, in the disclosure, the frequency-domain interval of the CRS is extended to 12 subcarriers, that is, there is one CRS RE in every 12 subcarriers. In the embodiment, a first OFDM symbol in each RB is set as a time-domain location of the CRS. As shown in FIG. 3, there is only one RE resource in an RB for transmitting the CRS, and other RE resources are not filled with signals.

The operation that the energy information of the first reference signal is determined based on the frequency-domain density of the first reference signal may include that: if a bandwidth of the LAA system is 20 MHz, then there are included 100 RB resources and there are 100 RE resources configured to transmit the CRS, energy of each CRS RE resource is determined through a following manner, i.e., i.e. EPRE [dB]=P[dB]−10*log 10(100), where P is sending power of sender network equipment, such as an LAA base station or an LAA terminal. In addition, in the embodiment, power of each CRS RE is the EPRE. Because normalized QPSK is adopted for the CRS RE in a 3GPP protocol, amplitude information of the CRS RE is required to be determined during practical sending, and thus the amplitude information is usually specified through the EPRE in a standard. Therefore, the signal energy of these CRS REs may reach to a sending power so as to enable the coverage to be maintained.

In the method, the frequency-domain signal of the first reference signal may be generated in a following manner: generating the frequency-domain signal with a length of 100 RE resources using a conventional LTE CRS generation manner, and simultaneously determining a starting location of CRS REs according to a cell ID, shift=mod(cell_ID,12).

The frequency-domain signal of the CRS may be generated in a following manner: generating Cinit; generating a Gold sequence with a length of 200 according to Cinit; generating a QPSK signal from the generated Gold sequence; determining a frequency-domain starting location according to the cell ID (Cell_ID); and generating the time-domain signal of the CRS through IFFT, as shown in FIG. 4.

Thus, with the above solution, the first reference signal may be generated at first, and then the CCA signal is generated based on the first reference signal after the target channel to be occupied by the LAA system is determined, and the CCA signal is mapped to the target channel and sent to the receiver network equipment. In such a manner, a channel occupied by the LAA system may be effectively identified by setting a special CCA signal, so that the receiver network equipment may rapidly determine the channel occupied by the LAA system, and a user experience for the LAA system may be improved.

Seventh Embodiment

Figure 15:
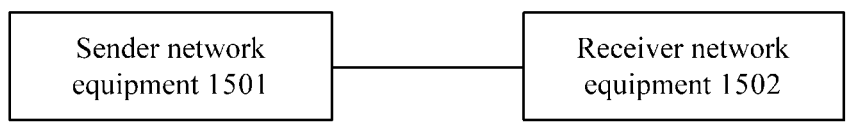
FIG. 15 is a structure diagram of a signal processing system according to an embodiment of the disclosure.

The seventh embodiment provides a signal processing system, as shown in FIG. 15, including:

sender network equipment 1501, configured to generate a first reference signal based on a frequency-domain density of the first reference signal and an energy value of the first reference signal on a time-frequency resource, determine a time-frequency resource location of a target channel, the target channel being configured to carry information of an LAA system, generate a CCA signal based on the time-frequency resource location of the target channel and the first reference signal, map the CCA signal to the target channel, and send the CCA signal to receiver network equipment through the target channel; and the receiver network equipment 1502, configured to access the target channel, determine whether the CCA signal is carried in the target channel based on the preset first reference signal, and if the CCA signal is carried in the target channel, determine that the target channel is applicable to transmit the information of the LAA system.

Function units of the sender network equipment and receiver network equipment in the embodiment are the same as embodiment 4 to embodiment 6, and will not be elaborated herein.

Thus it can be seen that, with adoption of the solution, the first reference signal may be generated, and after the target channel to be occupied by the LAA system is determined, the CCA signal is generated based on the first reference signal, and the CCA signal is mapped to the target channel and sent to the receiver network equipment. In such a manner, a channel occupied by the LAA system may be effectively identified by setting a special CCA signal, so that the receiver network equipment may rapidly determine the channel occupied by the LAA system, and a user experience for the LAA system may be improved.

In some embodiments provided by the disclosure, it should be understood that the disclosed equipment and method may be implemented in other manners. The equipment embodiment described above is only schematic, and for example, division of the units is only logic function division, and other division manners may be adopted during practical implementation. For example, multiple units or components may be combined or integrated into another system, or some characteristics may be neglected executed. In addition, coupling, or direct coupling or communication connection between each displayed or discussed component may be indirect coupling or communication connection, implemented through some interfaces, of the equipment or the units, and may be electrical and mechanical or adopt other forms.

The abovementioned units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each function unit in each embodiment of the disclosure may be integrated into a processing unit, each unit may also exist independently, and two or more than two units may also be integrated into a unit. The abovementioned integrated unit may be implemented in a hardware form, and may also be implemented in form of hardware and software function unit.

Those skilled in the art should know that: all or part of the steps of the abovementioned method embodiment may be implemented by instructing related hardware through a program, the abovementioned program may be stored in a computer-readable storage medium, and the program is executed to execute the steps of the abovementioned method embodiment; and the storage medium includes: various media capable of storing program codes such as mobile storage equipment, a Read-Only Memory (ROM), a Random Access Memory (RAM), a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

INDUSTRIAL APPLICABILITY

The embodiments of the disclosure disclose a signal processing method, network equipment and a system, wherein the method includes that: a first reference signal is generated, and after a target channel to be occupied by an LAA system is determined, a CCA signal is generated based on the first reference signal, and the CCA signal is mapped to the target channel and sent to receiver network equipment. In such a manner, a channel occupied by the LAA system may be effectively identified by setting a special CCA signal, so that the receiver network equipment may rapidly determine the channel occupied by the LAA system, and a user experience for the LAA system may be improved.

The invention claimed is:

1. A signal processing method, applied to a sender network device and comprising:
   generating a first reference signal based on a frequency-domain density of the first reference signal and an energy value of the first reference signal on a time-frequency resource;
   determining a time-frequency resource location of a target channel, the target channel being configured to carry information of a Licensed Assisted Access (LAA) system; and
   generating a Clear Channel Assessment (CCA) signal based on the time-frequency resource location of the target channel and the first reference signal, mapping the CCA signal to the target channel, and sending the CCA signal to a receiver network device through the target channel to enable the receiver network device to determine whether the target channel is applicable to the LAA system according to the CCA signal.

2. The method according to claim 1, wherein generating the first reference signal based on the frequency-domain density of the first reference signal and the energy value of the first reference signal on the time-frequency resource comprises:
   acquiring the frequency-domain density of the first reference signal;
   determining energy information of the first reference signal based on the frequency-domain density of the first reference signal;
   generating a frequency-domain signal of the first reference signal based on the energy information of the first reference signal; and
   converting the frequency-domain signal of the first reference signal into a time-domain signal.

3. The method according to claim 2, wherein generating the CCA signal based on the time-frequency resource location of the target channel and the first reference signal comprises:
   determining a sending mode of the CCA signal based on the time-frequency resource location of the target channel, and generating the CCA signal based on the sending mode of the CCA signal and the time-domain signal of the first reference signal.

4. The method according to claim 3, wherein determining the sending mode of the CCA signal based on the time-frequency resource location of the target channel comprises:
   determining that the CCA signal is sent once for every preset number of subcarriers on a frequency domain; acquiring a sending moment of the CCA signal, and determining a first duration based on the sending moment of the CCA signal;
   when the first duration is larger than or equal to a preset threshold value, determining the sending mode of the CCA signal as a first sending mode, the first sending mode referring to sending of the CCA signal only within the first duration; and when the first duration is smaller than the preset threshold value, determining the sending mode of the CCA signal as a second sending mode, the second sending mode referring to sending of the CCA signal within the first duration, a next adjacent complete Orthogonal Frequency Division Multiplexing (OFDM) symbol on a time domain and a cyclic prefix length of the OFDM symbol.

5. The method according to claim 4, wherein generating the CCA signal based on the sending mode of the CCA signal and the time-domain signal of the first reference signal comprises:
when the sending mode of the CCA signal is the first sending mode, setting a duration of the time-domain signal of the first reference signal to be the first duration to obtain the CCA signal; and
when the sending mode of the CCA signal is the second sending mode, setting the duration of the time-domain signal of the first reference signal to be equal to a sum of the first duration, a duration of a complete OFDM symbol and the cyclic prefix length of the OFDM symbol to obtain the CCA signal.

6. The method according to claim 2, wherein generating the CCA signal based on the time-frequency resource location of the target channel and the first reference signal comprises:
determining that the CCA signal is sent once for every preset number of subcarriers on a frequency domain; acquiring the sending moment of the CCA signal, and determining the first duration through taking the sending moment of the CCA signal as a starting point on a time domain; and determining a sum of the first duration, a next adjacent complete OFDM symbol on the time domain and a cyclic prefix length of the OFDM symbol as a sending duration of the CCA signal, and obtaining the CCA signal through cycling the time-domain signal of the first reference signal based on the sending duration.

7. A sender network device, comprising:
a signal generation unit, configured to generate a first reference signal based on a frequency-domain density of the first reference signal and an energy value of the first reference signal on a time-frequency resource;
a setting unit, configured to determine a time-frequency resource location of a target channel, the target channel being configured to carry information of a Licensed Assisted Access (LAA) system, and generate a Clear Channel Assessment (CCA) signal based on the time-frequency resource location of the target channel and the first reference signal; and
a sending unit, configured to map the CCA signal to the target channel, and send the CCA signal to a receiver network device through the target channel to enable the receiver network device to determine whether the target channel is applicable to the LAA system according to the CCA signal.

8. The sender network device according to claim 7, wherein the signal generation unit is configured to acquire the frequency-domain density of the first reference signal; determine energy information of the first reference signal based on the frequency-domain density of the first reference signal; generate a frequency-domain signal of the first reference signal based on the energy information of the first reference signal; and convert the frequency-domain signal of the first reference signal into a time-domain signal.

9. The sender network device according to claim 8, wherein the setting unit is configured to determine a sending mode of the CCA signal based on the time-frequency resource location of the target channel, and generate the CCA signal based on the sending mode of the CCA signal and the time-domain signal of the first reference signal.

10. The sender network device according to claim 9, wherein the setting unit is configured to determine that the CCA signal is sent once for every preset number of subcarriers on a frequency domain; acquire a sending moment of the CCA signal, and determine a first duration based on the sending moment of the CCA signal; when the first duration is larger than or equal to a preset threshold value, determine the sending mode of the CCA signal as a first sending mode, the first sending mode referring to sending of the CCA signal only within the first duration; and when the first duration is smaller than the preset threshold value, determine the sending mode of the CCA signal as a second sending mode, the second sending mode referring to sending of the CCA signal within the first duration, a next adjacent complete Orthogonal Frequency Division Multiplexing (OFDM) symbol on a time domain and a cyclic prefix length of the OFDM symbol.

11. The sender network device according to claim 10, wherein the setting unit is configured to, when the sending mode of the CCA signal is the first sending mode, set a duration of the time-domain signal of the first reference signal to be the first duration to obtain the CCA signal; and when the sending mode of the CCA signal is the second sending mode, set the duration of the time-domain signal of the first reference signal to be equal to a sum of the first duration, a duration of a complete OFDM symbol and the cyclic prefix length of the OFDM symbol to obtain the CCA signal.

12. The sender network device according to claim 8, wherein the setting unit is configured to determine that the CCA signal is sent once for every preset number of subcarriers on a frequency domain; acquire the sending moment of the CCA signal, and determine the first duration through taking the sending moment of the CCA signal as a starting point on a time domain; and determine a sum of the first duration, a next adjacent complete OFDM symbol on the time domain and a cyclic prefix length of the OFDM symbol as a sending duration of the CCA signal, and obtain the CCA signal thorough cycling the time-domain signal of the first reference signal based on the sending duration.

13. A non-transitory computer storage medium, in which a computer-executable instruction is stored, the computer-executable instruction being configured to execute a signal processing method, applied to a sender network device and comprising:
generating a first reference signal based on a frequency-domain density of the first reference signal and an energy value of the first reference signal on a time-frequency resource;
determining a time-frequency resource location of a target channel, the target channel being configured to carry information of a Licensed Assisted Access (LAA) system; and
generating a Clear Channel Assessment (CCA) signal based on the time-frequency resource location of the target channel and the first reference signal, mapping the CCA signal to the target channel, and sending the CCA signal to a receiver network device through the target channel to enable the receiver network device to determine whether the target channel is applicable to the LAA system according to the CCA signal.

* * * * *